United States Patent

[11] 3,603,034

| [72] | Inventor | John P. Maxwell-Stewart<br>Battle, England |
|---|---|---|
| [21] | Appl. No. | 833,577 |
| [22] | Filed | June 16, 1969 |
| [45] | Patented | Sept. 7, 1971 |
| [73] | Assignee | Jegco Inc.<br>Oakland, Calif. |

[54] PLANT-GROWTH STRUCTURE
5 Claims, 4 Drawing Figs.

[52] U.S. Cl............................................... 47/38,
206/46 PL
[51] Int. Cl........................................ A01g 9/02
[50] Field of Search........................................ 47/1.2, 14,
16, 9, 34, 34.11, 36, 38, 38.1, 56, 18; 206/45.32,
45.33, 46 PL; 220/4 E

[56] References Cited
UNITED STATES PATENTS

| 1,848,219 | 3/1932 | Kerr................................ | 47/14 |
| 1,983,806 | 12/1934 | Norman......................... | 47/18 |
| 2,062,755 | 12/1936 | Lyons et al. .................... | 47/16 |
| 2,545,717 | 3/1951 | Voigt.............................. | 47/18 |
| 2,638,715 | 5/1953 | Schroeder....................... | 47/18 |
| 2,681,142 | 6/1954 | Cohen............................. | 220/4 X |
| 3,362,106 | 1/1968 | Goldring........................ | 47/56 |

FOREIGN PATENTS

| 867,118 | 5/1961 | Great Britain................ | 47/16 |
| 971,032 | 9/1964 | Great Britain................ | 47/38.1 |
| 123,692 | 12/1927 | Switzerland.................. | 47/38 |

Primary Examiner—Robert E. Bagwill
Attorney—Gardner & Zimmerman

ABSTRACT: A plant-growth structure equipped with a growth media in which seeds can be planted and nurtured thereby into mature plant growth suitable for harvesting, in the case of agricultural plants. The structure includes an elongated container providing a chamber therealong in which such growth media resides, and the container has sidewalls provided at their upper ends with outwardly extending flanges to which a top cover overlying such chamber and the growth media therein is releasably attached by means of clamp-type fasteners. An irrigation system runs through the chamber to enable the growth media and plant life therein to be irrigated, and a drainage system associated with the container permits any excess liquids resulting from irrigation to drain from the growth media and chamber.

PATENTED SEP 7 1971  3,603,034
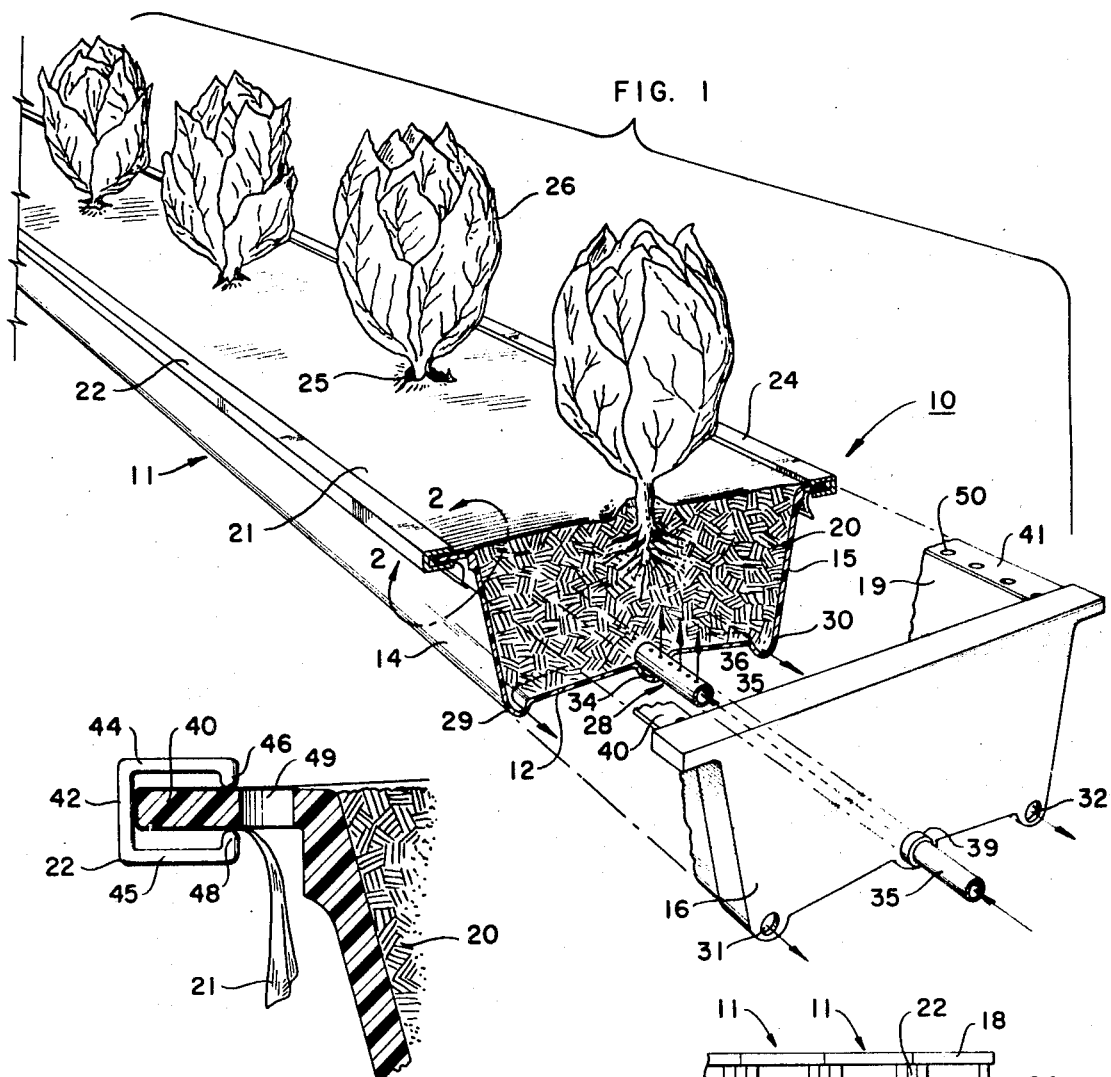
FIG. 1
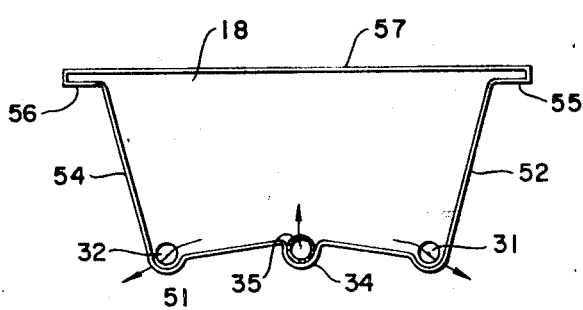
FIG. 2
FIG. 3
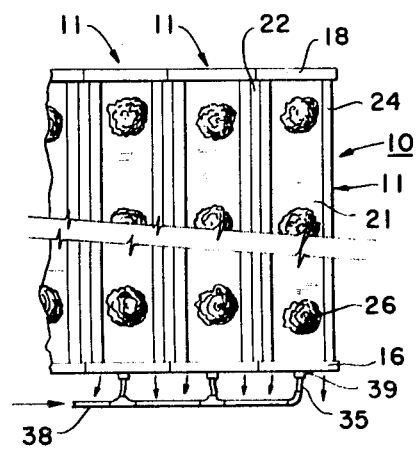
FIG. 4
INVENTOR:
JOHN P. MAXWELL-STEWART
BY: *Joseph B. Gudner*
HIS ATTORNEY

PLANT-GROWTH STRUCTURE

This invention relates generally to the field of agriculture and, more particularly, to a plant-growth structure in which mature plants, including agricultural crops and ornamentals can be grown from seeds and seedlings.

As explained in Goldring U.S. Pat. No. 3,362,106, many attempts have been made in the past to improve agricultural techniques, but for the most part such efforts toward improvement have not been completely successful largely because they have involved the concept of locating plant seeds along a tape, cord or other carrier that, for planting, is buried in the ground. For some reason, a great number of the seeds planted in this manner never reach maturity, and as a consequence, farmers generally prefer to sow large quantities of seed indiscriminately with the expectation that by so doing a substantially complete crop will mature. The aforementioned patent discloses a type of seed package which is self-contained and provides a complete preselected nutritional environment to control and sustain the growth of the seeds contained within the package into mature plants under generally optimum growth conditions; and it further provides an integral irrigation system capable of supplying water and fertilizer solutions directly to the plants under controlled conditions, thereby maximizing water economy and, at the same time, optimizing growth conditions and rates.

An object, among others, of the present invention is to provide an improved plant-growth structure, somewhat analogous to the self-contained seed package disclosed in such patent since it enables seeds to germinate and develop into mature plants under optimum or generally ideal growth conditions.

Another object of the invention is in the provision of an improved plant-growth structure of the character described that includes an irrigation system by means of which a plant-growth media within the structure is irrigated by liquids directed toward the root structure of the plants, and that further includes a drainage system by means of which excess liquids can drain from the growth media and discharge from the structure.

Still another object is that of providing a plant-growth structure of the type explained that is equipped with fasteners by means of which a thin flexible top cover can be secured to the structure in overlying relation with the growth media supported therewithin, and through which cover plant life can emerge from openings provided for this purpose.

A further object of the invention is to provide a plant-growth structure that is simple, lightweight, may be assembled by unskilled labor using substantially no (or only minimal) tools, that is reusable and has a long life expectancy, and is also versatile in the sense that it can be either expanded or reduced in size as economic conditions may require.

Yet a further object is in the provision of a plant-growth structure comprising an elongated, longitudinally extending container providing a chamber therealong for receipt of a growth media therein, and which container is equipped centrally adjacent the bottom wall thereof with an irrigation system and, at a slightly lower elevation, with a drainage system by means of which excess liquids can be removed from the chamber; the container having upwardly extending sidewalls provided at the upper edges thereof with outwardly turned flanges respectively associated with C-shaped clamp fasteners cooperative with such flanges to secure a top cover thereto in overlying relation with the growth media.

Additional objects and advantages of the invention, particularly as concerns specific features and details thereof, will become apparent as the specification develops.

An embodiment of the invention is illustrated in the accompanying drawing in which:

FIG. 1 is a broken perspective view showing the plant-growth structure filled with a growth media and with illustrative plants having emerged through openings provided therefor in the top cover of the structure;

FIG. 2 is an enlarged, broken vertical-sectional view taken within the line 2—2 of FIG. 1;

FIG. 3 is an end view in elevation of one of the end walls of the structure looking toward the inner surface thereof; and FIG. 4 is a broken top plan view on reduced scale showing a plurality of plant-growth structures oriented in side-by-side relation and having the respective irrigation means thereof connected to a water supply conduit.

A plant-growth structure embodying the invention is partially illustrated in FIG. 1 and is denoted in its entirety with the numeral 10. The structure 10 comprises an elongated, longitudinally extending channel or container 11 having a bottom wall 12 and sidewalls 14 and 15 extending upwardly therefrom. The container 11 further comprises end walls 16 and 18 (the latter being seen in FIGS. 3 and 4) which may be removably securable to the side and bottom walls of the container, as will be described in greater detail hereinafter. A chamber 19 is defined within the container 11 and it is adapted to be filled with a plant-growth media 20 as shown.

Extending across the chamber 19 in overlying relation with the growth media 20 is a top closure 21 that is secured to the container 11 by fastener structures 22 and 24. The growth media 20 is intended to have seeds planted at longitudinally spaced locations therealong, and at each such location the top cover 21 is provided with an emergence hole 25 through which a plant 26 emerges as a consequence of germination and growth of such seeds.

The container 11 is also provided with an irrigation system or means generally denoted with the numeral 28 and by means of which the plants 26 and seeds from which they germinate are supplied with water and any liquid nutrients that may be added thereto. The container 11 is further provided with a drainage system by means of which excess liquids are removed from the chamber 19 and from the growth media 20 therewithin; and the drainage system comprises a pair of longitudinally extending channels 29 and 30 disposed along the longitudinal edges of the bottom wall 12, and outlets 31 and 32 formed in the end walls 16 and 18 so as to respectively communicate with the channels 29 and 30.

The bottom wall 12 and sidewalls 14 and 15 of the container 11 may be formed integrally, as shown, and the channels 29 and 30 are located along the mergence of the respective sidewalls with the bottom wall and open upwardly into the chamber 19. The channels 29 and 30 advantageously extend the entire length of the container 11. As is most apparent in FIG. 3 which illustrates the end wall 18, the bottom wall 12 of the container is inclined upwardly and inwardly from the outer longitudinal edges thereof to a higher elevation adjacent its longitudinal center at which the irrigation means 28 are disposed. Accordingly, the channels 29 and 30 of the drainage system are at a lower elevation than the irrigation means 28.

The irrigation means 28 include a recess 34 located along the longitudinal center of the bottom wall 12 and extending substantially from end to end thereof. The recess 34 opens upwardly into the chamber 19, and it has a flow conduit 35 seated therein that is provided with a plurality of upwardly opening apertures 36 through which irrigation liquids can issue or discharge into the growth media 20. The conduit 35 projects through an opening provided therefor in each of the end walls 16 and 18, as shown in FIG. 1, for connection at one end (the other end ordinarily being closed) to a manifold or supply conduit 38, as depicted in FIG. 4, by means of which water and other liquids can be delivered to the conduit 35 for distribution within the growth media 20.

It will be apparent that the conduit or manifold 38 must be connected to a supply of water under pressure and that valves (not shown) need be included to control the flow of water therethrough. A chamber, not shown, or other means may be provided along the supply conduit 38 to enable liquid additives such as plant nutrients, insecticides, etc. to be added to the irrigation water. Evidently, it is desirable to maintain orientation of the conduit 35 so that the apertures 36 therealong face upwardly toward the roots of the plants 26 which are located along the center of chamber 19 and thereby overlie the conduit 35 in substantial alignment therewith. Any suitable means may be used to maintain the desired alignment of the conduit 35 including an adhesive securance thereof to the recess 34, rigid fittings by means of which the irrigation conduit 35 is connected to the supply conduit 38, or by the exemplary means shown in FIGS. 1 and 4 that constitute a collar 39 circumjacent the conduit 35 along the outer surface of the end wall 16 and that may be attached by any convenient means such as adhesives, threads, etc.

The sidewalls 14 and 15 of the container 11 extend upwardly and outwardly so that the chamber 19 has a somewhat greater transverse dimension at its upper end than at the bottom thereof. At their upper extremities, the sidewalls 14 and 15 are respectively equipped with outwardly extending flanges 40 and 41 cooperative with the fasteners 22 and 24 in fixedly securing the top cover 21 in overlying relation with the chamber 19. In this respect, the top cover 21 is thin and flexible as explained hereinbefore and it is drawn over the flanges 40 and 41, as illustrated best in FIG. 2, and is held in position by the associated fasteners 22 and 24. Advantageously, the fasteners 22 and 24, which may be identical, extend from end to end of the associated sidewalls and outwardly projecting flanges thereof so as to effect a relatively airtight seal between the top cover and flanges all along the lengths thereof.

For this purpose, each fastener 22 is, in cross section, a C-shaped clamp having a vertical wall 42, top and bottom walls 44 and 45, and inwardly turned clamping edges 46 and 48 that respectively press against the top and bottom surfaces of the associated flange 40 or 41 and thereby confine the top cover 21 in contiguous relation therewith. Understandably, each of the fasteners 22 and 24 must be somewhat resilient so as to permit the edges 46 and 48 to be urged inwardly or toward each other because of an intrinsic biasing force to clamp the cover 21 to the flanges, as shown, and to permit the edges 46 and 48 to be spread slightly to permit them to slide over the associated flange. Any number of materials can be employed which have the inherent resilience required, and by way of example, an extruded polyvinyl chloride has been found satisfactory.

The top cover 21 may also be formed of various materials, and an excellent material that can be used is mulching polyethylene, preferably black so as to maximize transmission of the sun's heat to the growth media 20. The top cover 21 serves to minimize evaporation of moisture from the growth media 20, and it also serves to protect the growth media and seeds and plants growing therein from atmospheric contamination as, for example, windblown weed and other unwanted seeds, infestation from insect larva, etc.

The flanges 40 and 41 are respectively provided therealong with longitudinally spaced apertures or openings 49 and 50 that are located adjacent the sidewalls 14 and 15 and therefor lie inwardly of the respectively associated fasteners 22 and 24. The openings 49 and 50 may be used in securing the container to the ground or other support surface to prevent it from being overturned inadvertently as, for example, by high winds acting against relatively tall plants growing upwardly from the container. In many instances, it may not be necessary to use the openings 49 and 50 in which event they serve no particular function. It will be evident that should the openings be used, the means associated therewith to anchor the container 11 in a fixed position are most easily connected prior to the top cover 21 being positioned in its overlying relation with the chamber 19 and flanges 40 and 41 shown in the drawings.

The end walls 16 and 18 may be removably secured to the side walls 14 and 15 and bottom wall 12, thereby enabling the container 11 to be quickly and easily changed in length whenever this is necessary or desirable (usually extended), and it also enables a plurality of the containers to be shipped and stored in nested relation. In the particular structure shown, the bottom walls 12 and sidewalls 14 and 15 are adapted to telescope or slide into spaces provided for this purpose in the end walls. For this purpose, and referring particularly to Fig. 3, it will be observed that each end wall is provided with a perimetric edge portion that includes a bottom lip 51, upwardly extending side lips 52 and 54, flange lips 55 and 56 respectively provided adjacent the upper extremities of the lips 52 and 54, and a top lip 57. The configuration of the lips 51, 52, and 54 through 57 corresponds to the configuration of the bottom and side walls and flanges of the container 11 so that the end of each container can be slipped into the space defined therefor by each end wall within the perimetric edge thereof. If desired, the end walls 16 and 18 may be fixedly secured in their connected relation to the bottom and sidewalls of the container by any suitable means such as adhesives, tape joints, and the aforementioned collar 39 may also serve this function.

The container 11 including the end walls 16 and 18 thereof may be formed of any material adequate to contain or confine the growth media 20 within the chamber 19 and be relatively impervious to atmospheric contamination, and a specific example of a suitable material is polyvinyl chloride. Such synthetic plastic material is advantageously extruded in the desired configuration, and in a typical instance will have a thickness of about one-eighth of an inch. Although the particular color of the container 11 is not critical, it is of advantage to have it black or of other dark color so as to maximize heat transmission to the growth media 20 upon exposure of the container to sunlight.

The container 11 may also be provided in any convenient lengths which is handily accomplished if the containers are extruded components since each extrusion may be continuous and is simply segmented or cut into the lengths desired. By way of example, typical lengths can be from 6 feet to 10 feet. Also, the widths and heights of the container may differ depending upon the particular plants, planting patterns, and root structures for which the containers are intended, and typical sizes are 6 inches wide by 2 inches deep, 12 inches wide by 2 inches deep, and 6 inches by 6 inches. It might be observed that the irrigation tube or conduit 35 can be formed integrally with the container 11 and bottom wall 12 thereof, but usually it is more economical to provide a separate conduit 35 and equip the container 11 therewith as herebefore explained.

In use of the plant-growth structure 10, it may be provided either with or without a growth media 20 in the chamber 19, and in the absence of such growth media, the end walls 16 and 18 may be disassembled from the bottom and sidewalls. Assuming the case in which the structures are so disassembled, prior to use one or more containers 11 is equipped with end walls 16 and 18 so as to define a substantially closed chamber 19 adapted to receive a growth media 20 therein. In the instance of a plurality of containers being disposed in end-to-end orientation, it may be advantageous to omit the interposition of end walls at the junctures of successive containers and simply abut the adjacent ends thereof. In this case, any convenient means may be used to join such abutted ends, a tape joint for example. (In many instances no jointure may be sufficient). An irrigation conduit 35 is extended along the recess 34 in the bottom wall of the container and may be secured in proper position as heretofore indicated.

Following such assembly of the plant-growth structure, a growth media 20 is placed within the chamber 19 either before or after the container is positioned at the location of use intended therefor, and it may be anchored thereat to the support surface therefor by use of the apertures 49 and 50, all as heretofore explained. Usually, the top cover 21 then will be extended over the chamber 19 and growth media therein and secured in position by means of the fasteners 22 and 24 as previously explained. Thereafter, seeds are planted within the growth media by first penetrating the top cover 21 at longitudinally spaced locations therealong so as to form emergence openings 25 therein through each of which a seed is depressed into the growth media and through which the plant developing from each such seed emerges. The irrigation conduit 35 may be permanently connected through suitable valving to a water supply, or it may be connected thereto only during those intervals that it is desired to irrigate the growth media and plants or seeds contained therein. In many instances, it may be convenient to arrange a plurality of plant-growth structures 10 in side-by-side disposition, as shown in FIG. 4, and water supplied to each from a common supply line or manifold 38. It will be appreciated that the irrigation conduit 35 must be plugged or otherwise closed at the end thereof remote from the supply line so that water does not escape to waste.

The plants 26 are best located directly above the irrigation conduit 35 so that to a considerable extent, the water discharging therefrom through the apertures 36 tends to be localized at the areas of use to minimize waste. Excess moisture readily drains from the growth media 20 into the channels 29 and 30 which are lower than the irrigation conduit 35 and define the lowest level along the bottom wall 12 of the container. Since such channels 29 and 30 communicate with the discharge openings 31 and 32, the moisture collected therealong drains readily from the container. The top cover 21 also inhibits evaporation of moisture from the planting media 20, and following harvest of the plants 26 the cover may be subdivided and mulched into the growth media 20 which is best (but not necessarily) discarded after one plant-life cycle.

In some instances, it may be desirable to use the plant-growth structure without the top cover 21 and in such cases, the advantages of the cover are lost; including, in addition to water evaporation, maintenance of the growth media in a sterile condition substantially free of viruses, pests, and other infestation, and protection of the growth media from contamination by weed seeds. Although structures 10 can be provided in a preloaded condition in which a growth media 20 is within the chamber 19 of an assembled container, this resultant increase in the weight of the structure makes it somewhat difficult to handle, perhaps requiring mechanized processing in the event of long structures, and increases the costs of shipping. Although the growth media can be reused, it is readily replaced when this is desired and can have insecticides, plant nutrients, etc. mixed therein to facilitate growth of plant life.

The structure 10 is simple and requires little maintenance, it can be expected to have a long life because it is reusable repeatedly for successive plant-growth cycles; it is lightweight and can be assembled by unskilled labor with the most simple or rudimentary tools, and it is quite versatile in terms of requirements being readily expanded or contracted as necessary.

While in the foregoing specification, an embodiment of the invention is illustrated and described in considerable detail for purposes of making a complete disclosure thereof, and it will be apparent to those skilled in the art that numerous changes may be made in such details without departing from the spirit and principles of the invention.

What is claimed is:

1. A plant-growth structure comprising a longitudinally extending rigid container having a bottom wall and side walls extending upwardly therefrom and end walls cooperative with said bottom and side walls to provide a chamber for receipt therein of a growth medium for plant life, an irrigation conduit for supplying such growth medium with liquids, a drainage system including an outlet provided by said container to enable excess liquids to drain from such growth medium, said sidewalls having outwardly projecting flanges adjacent their upper edges, a top closure extendable over said chamber in overlying relation with said flanges, fastener means for releasably securing said top closure to said flanges, said bottom wall extending upwardly and inwardly from said sidewalls to a higher elevation adjacent its longitudinal center and along the longitudinal edges thereof and provided along such center with a longitudinally extending recess receiving said irrigation conduit, said conduit being provided with longitudinally spaced apertures therealong through which said irrigation liquids can be released into such growth medium, and said bottom wall having a pair of longitudinally extending channels respectively disposed along the longitudinal edges thereof at a lower elevation than said recess for carrying excess liquids to said outlet.

2. The structure of claim 1 in which said fastener structure includes a pair of clamps respectively cooperative with said flanges for securing said top closure thereto, in which said top closure is a relatively thin flexible membrane, and in which each of said clamps is a substantial continuous C-shaped member of substantially the same length as said flanges so as to extend from end to end thereof.

3. The structure of claim 1 in which said container is relatively rigid, and in which said end walls are removably securable to the side and bottom walls.

4. A plant-growth structure comprising a longitudinally extending rigid container having a bottom wall and sidewalls extending upwardly therefrom and end walls cooperative with said bottom and sidewalls to provide a chamber for receipt therein of a growth medium for plant life, an irrigation conduit for supplying such growth medium with liquids, a drainage system including an outlet provided by said container to enable excess liquids to drain from such growth medium, said bottom wall extending upwardly and inwardly to a higher elevation adjacent its longitudinal center than along the longitudinal edges thereof and being provided along such center with a longitudinally extending recess receiving said irrigation conduit, said conduit having longitudinally spaced apertures through which irrigation liquids can be released into such growth medium, and at least one of said end walls being provided with a pair of transversely spaced outlet ports defining the aforesaid outlet and with an opening passing said irrigation conduit therethrough, said bottom wall having a pair of longitudinally extending channels respectively communicating with said outlet ports and disposed along the longitudinal edges of said bottom wall at a lower elevation than said recess for carrying excess liquids to said outlet ports.

5. The structure of claim 4 in which said side walls have outwardly projecting flanges adjacent their upper edges, and further comprising a relatively thin flexible membrane defining a top closure extending over said chamber and growth medium in overlying relation with said flanges, and fastener structure releasably securing said top closure to said flanges and including a pair of clamps respectively cooperative with said flanges for securing said top closure thereto, each of said clamps being a substantially continuous C-shaped member of substantially the same length as said flanges so as to extend from end to end thereof.